G. W. KIBBEE.
FEVER-COT.
No. 176,472. Patented April 25, 1876.
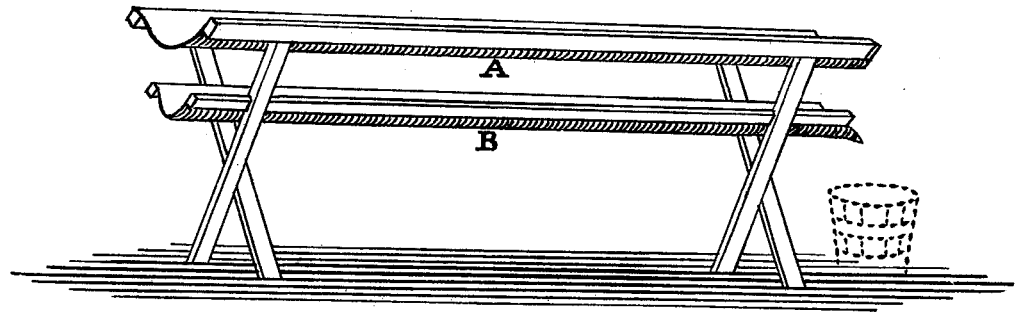
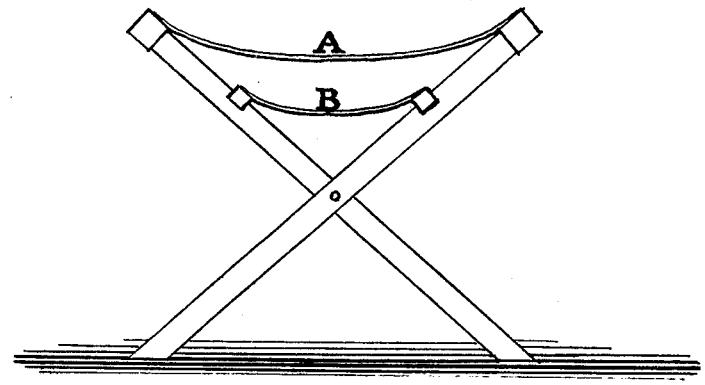
Witnesses
James Walton
John S. Walton
George W. Kibbee
Inventor.

UNITED STATES PATENT OFFICE.

GEORGE W. KIBBEE, OF SALEM, OREGON.

IMPROVEMENT IN FEVER-COTS.

Specification forming part of Letters Patent No. 176,472, dated April 25, 1876; application filed December 18, 1875.

*To all whom it may concern:*

Be it known that I, GEORGE W. KIBBEE, of the city of Salem, Marion county, in the State of Oregon, have invented a Fever-Cot, of which the following is a specification:

The main object of my invention is to secure the means of regulating with water, cool or hot, as the case may require, the temperature of the patient's body.

This I accomplish by the use of a pervious canvas bottom, A, through which the water used may percolate into an impervious bottom, B, beneath, thus securing a uniform temperature on the under as well as on the upper surface of the patient's body, instead of incurring the heat and steam of an impervious bed.

The water-proof bottom B, made of rubber or oil-cloth, takes the drip from above and conveys it into a suitable vessel placed to catch it, thus obviating the wetting of the bed and bedding, and keeping the sick-chamber dry.

I claim as my invention—

A double-bottomed fever-cot, the upper bottom of which is pervious to water, and the lower bottom composed of rubber cloth or other water-proof fabric, substantially as described and shown, and for the purposes set forth.

GEORGE W. KIBBEE.

Witnesses:
JAMES WALTON,
C. W. SHAW.